(12) United States Patent
Hanlon

(10) Patent No.: US 11,625,967 B2
(45) Date of Patent: Apr. 11, 2023

(54) SYSTEMS AND METHODS FOR ITEM DELIVERY INTEGRATION WITH A SMART HOME

(71) Applicant: United States Postal Service, Washington, DC (US)

(72) Inventor: Robert Sean Hanlon, Orchard Park, NY (US)

(73) Assignee: United States Postal Service, Washington, DC (US)

(*) Notice: Subject to any disclaimer, the term of this patent is extended or adjusted under 35 U.S.C. 154(b) by 0 days.

(21) Appl. No.: 17/397,806

(22) Filed: Aug. 9, 2021

(65) Prior Publication Data
US 2021/0366217 A1 Nov. 25, 2021

Related U.S. Application Data

(63) Continuation of application No. 16/734,114, filed on Jan. 3, 2020, now Pat. No. 11,087,575.

(60) Provisional application No. 62/789,059, filed on Jan. 7, 2019.

(51) Int. Cl.
| G07C 9/21 | (2020.01) |
|---|---|
| G06Q 10/08 | (2012.01) |
| H04W 4/029 | (2018.01) |
| H04W 4/021 | (2018.01) |
| G06Q 10/0833 | (2023.01) |

(52) U.S. Cl.
CPC ........... *G07C 9/21* (2020.01); *G06Q 10/0833* (2013.01); *H04W 4/021* (2013.01); *H04W 4/029* (2018.02)

(58) Field of Classification Search
None
See application file for complete search history.

(56) References Cited

U.S. PATENT DOCUMENTS

| 9,373,201 | B2 * | 6/2016 | Jefferies | G06Q 30/0645 |
|---|---|---|---|---|
| 10,762,735 | B2 | 9/2020 | Sauer et al. | |
| 2006/0145837 | A1 | 7/2006 | Horton et al. | |
| 2016/0335595 | A1 | 11/2016 | Levy et al. | |
| 2018/0144430 | A1 * | 5/2018 | Millhouse | G06Q 10/06395 |
| 2018/0165631 | A1 | 6/2018 | Romero et al. | |
| 2018/0165637 | A1 | 6/2018 | Romero et al. | |
| 2019/0114564 | A1 | 4/2019 | Ferguson et al. | |
| 2019/0130352 | A1 | 5/2019 | Ivester | |
| 2019/0196479 | A1 | 6/2019 | Kaneko et al. | |

* cited by examiner

*Primary Examiner* — Carlos Garcia
(74) *Attorney, Agent, or Firm* — Knobbe Martens Olson & Bear LLP

(57) ABSTRACT

Systems and methods to deliver items to smart receptacles or locations secured by smart locks. A distribution network can provide access codes or credentials to access smart locks. Access codes or credentials can be provided when a mobile delivery device is determined to be within a geofence of the delivery point and/or when the mobile delivery device meets specified security criteria.

13 Claims, 4 Drawing Sheets

SYSTEMS AND METHODS FOR ITEM DELIVERY INTEGRATION WITH A SMART HOME

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application is a continuation of U.S. application Ser. No. 16/734,114, filed Jan. 3, 2020, which, in turn, claims the benefit of priority to U.S. Application No. 62/789,059 filed Jan. 7, 2019, the entire contents all of which are hereby incorporated by reference.

BACKGROUND

Item delivery is increasing as more consumers purchase items online and have them delivered to their homes or businesses. Increased item delivery means that problems facing item delivery, including missed deliveries, re-scheduling of deliveries, signature requirements, and theft of items, are also rising. It is desirable to have a home or business item delivery solution which addresses these problems.

SUMMARY

In one aspect described herein, a system for item delivery comprises a server in communication with a locking device, the locking device configured to be unlocked in response to an access code; a mobile delivery device in communication with the server, the mobile delivery device comprising a scanner and a location sensing circuit, the mobile delivery device configured to scan an item for delivery to a delivery point and to communicate an access code for unlocking the locking device; and a distribution network server configured to receive scan information and location information from the mobile delivery device and provide the access code in response to receiving the scan information and location information; and wherein the distribution network server is configured communicate the access code to the server when the mobile delivery device is within a geofence of the delivery point.

In some embodiments, the location information comprises a current location and breadcrumb data for the mobile delivery device.

In some embodiments, the server is further configured to send the access code to the locking device in response to the received location information and breadcrumb data.

In some embodiments, wherein the breadcrumb data includes an indication that a delivery resource was traversing a pre-determined route prior to entering the geofence of the delivery point.

In some embodiments, the mobile delivery device is configured to scan a computer readable code on the item for delivery, and wherein the scan information is generated based on the scan of the computer readable code.

In some embodiments, the server is configured to generate the access code.

In some embodiments, wherein the distribution network server is configured to generate the access code.

In some embodiments, the system further comprises an item originator server configured to communicate item information to the server in response to an item being ordered and designated for delivery via a distribution network.

In some embodiments, the item originator server is configured the item information to the processor.

In some embodiments, the item originator server is configured to generate the access code.

In another aspect described herein, a method of item delivery comprises scanning, by a mobile computing device, an item for delivery; receiving, in a processor, location information and scan information from the mobile computing device; determining, by a processor, whether location information corresponds to a geographic location of an intended delivery point for the item; generating, in a processor, an access code for opening a smart lock associated with the delivery point based on the determination; sending, to the smart lock, the access code; and opening the access code to allow access to a lockable volume secured by the smart lock.

In some embodiments, the location information includes geographic coordinates of the mobile computing device and breadcrumb data for the mobile computing device.

In some embodiments, the method further comprises, determining, by a processor, a route associated with the mobile computing device.

In some embodiments, determining whether the location information corresponds to a geographic location comprises determining whether the mobile computing device is within a geofence of the intended delivery point and determining whether the breadcrumb data corresponds to the route associated with the mobile computing device.

In some embodiments, the method further comprises receiving, in a processor, the time of day when the scan of the item occurred.

In some embodiments, the method further comprises determining whether the time of day when the scan occurred corresponds with the route associated with the mobile computing device.

In some embodiments, generating the access code is further based on the determination whether the time of day corresponds with the route associated with the mobile computing device.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

DETAILED DESCRIPTION

Figure 1:
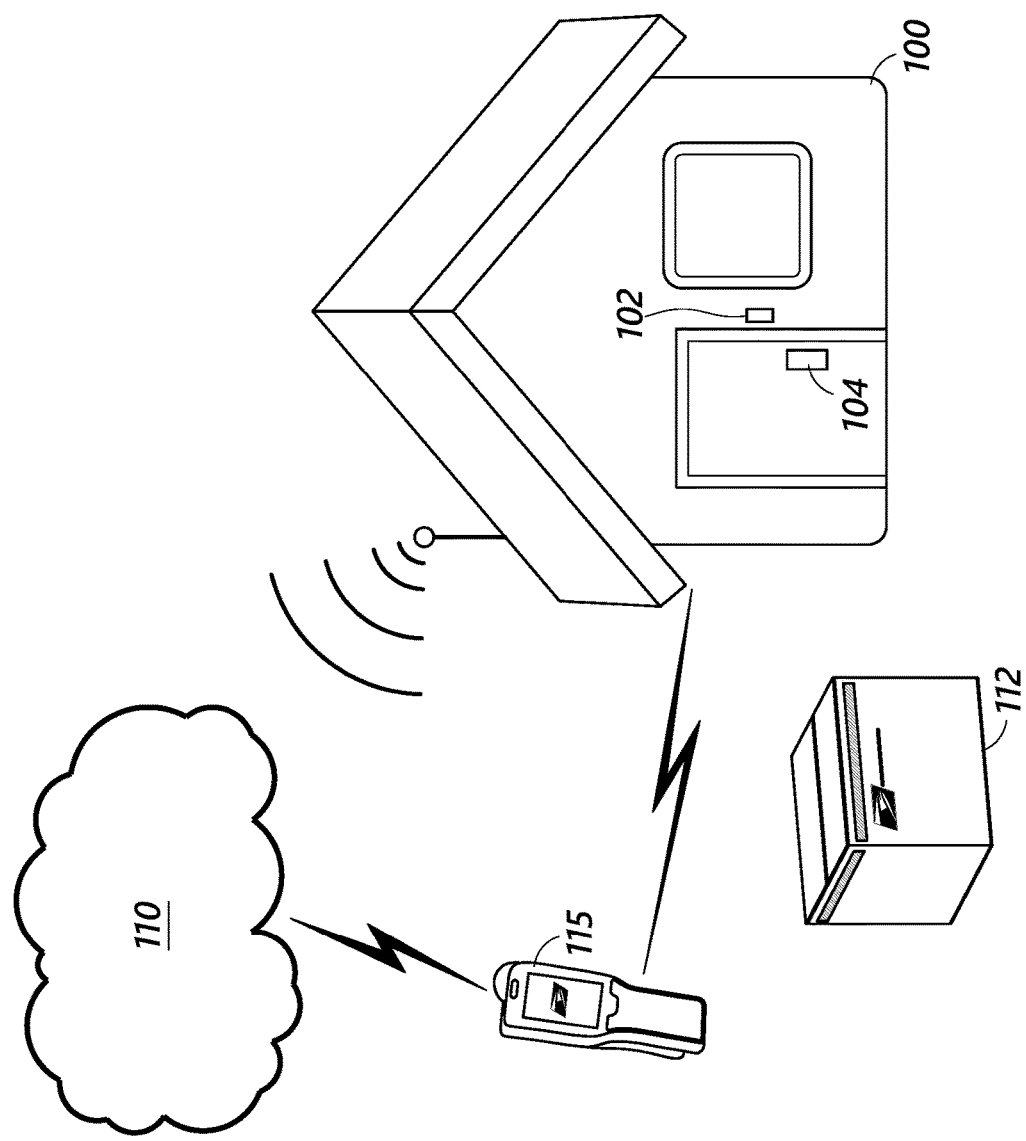
FIG. 1 is a diagram of a system for use with item deliveries.

In the following detailed description, reference is made to the accompanying drawings, which form a part thereof. In the drawings, similar symbols typically identify similar components, unless context dictates otherwise. Thus, in some embodiments, part numbers may be used for similar components in multiple figures, or part numbers may vary depending from figure to figure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

The quantity of items, such as packages and parcels, being delivered to homes and businesses is rising. Often no one is at home to receive a delivery, and delivery efficiency may be reduced by missing a delivery or re-scheduling a delivery, or by waiting for a recipient to answer the door or be home to receive a package. With the rise of internet connected homes or smart homes, unattended home delivery can be safely and securely accomplished by a delivery network, such as the United States Postal Service (USPS), using systems and methods that implement features of smart homes, and/or which take advantage of the unique aspects of the USPS distribution network, including the reliability and security offered by the USPS distribution network.

As a non-limiting example, a customer having a connected smart home device, may order an item from an online retailer. The online retailer can generate delivery information and provide the delivery information to a delivery network, such as USPS. The customer can provide an ability for a delivery resource, such as carrier, the ability to access a home, a secure delivery receptacle, or other similar location. The customer can provide, for example, a code, such as a one-time code, a credential, or permission in a delivery profile, such as with an account for the distribution network. In some embodiments, the customer can provide a code, credential, or other access opportunities to an online retailer or to a smart home device for accessing a smart lock on the smart home or receptacle for the carrier to deliver the item. In some embodiments, the distribution network, such as the USPS, can generate or provide a code and communicate the code to a network component which will enable the carrier to access a smart home or receptacle for delivery of the item.

As a carrier approaches the delivery point to deliver an item, the carrier, using a mobile delivery device, receives codes, credentials, or other permission or authorization to access a smart device, such as a smart receptacle or smart lock. In the case of the USPS, the breadcrumb data or GPS information from the mobile delivery device can be used as an added security measure prior to authorizing opening of the smart lock. The carrier can enter the code in the lock, or the carrier's mobile delivery device can communicate a token or security access code with the smart lock to allow access to the door. The carrier opens the door and places the item inside the home. When the carrier closes the door, the door relocks, and information, including video, time stamps and any other desired information is recorded, associated with the delivery, and provided to the recipient of the item. In this way, the item can be safely delivered and protected from theft when the recipient is not home. This method can also substitute for deliveries where a signature would be required. These processes will be described in greater detail below.

FIG. 1 is an exemplary diagram of a smart home item delivery. A smart home 100 can be a home or business, or any delivery location, that has or utilizes a smart speaker, internet connected devices, a smart hub for controlling aspects of the house, and the like. The smart home 100 can include a smart doorbell 102 and a smart lock 104. In some embodiments, the smart lock 104 can be a lock on a door. In some embodiments, the smart lock 104 can be on a smart receptacle. The smart receptacle can be configured to receive item delivery. The smart receptacle can be, for example, a mailbox, a package receptacle designated for parcel or package delivery, and the like. In some embodiments, a smart home 100 may have both a smart lock 104 on the door and on a smart receptacle. The smart home 100 and the smart components are in wireless or wired connection with a server 110. The server 110 can be a cloud based computing network. The server 110 communicates with a component of the smart home 100 such as a hub (not shown), which, in turn, can communicate with the smart doorbell 102 and the smart lock 104. In some embodiments, the server 110 can communicate with the smart doorbell 102 and the smart lock 104. In some embodiments, the server 110 can comprise one or more separate and/or independent networks, for example, a network or server which is associated with a delivery network, a network or server which is associated with a smart home services supplier, and a network or server which is associated with a retailer.

A carrier 114 is a component of a delivery network which delivers items 112 to delivery points, including, for example, to the smart home 100. The server 110 can also communicate with a mobile delivery device 115 via a wired or wireless connection. The carrier 114 can carry the mobile delivery device 114. The mobile delivery device 114 can include a scanner, wireless communication features, positioning capabilities, such as GPS, and an input interface. The mobile delivery device 114 can be similar to the mobile delivery devices such as are used by USPS carriers.

The mobile delivery device 114 is also configured to communicate with the smart home 100 and the components of the smart home. The mobile computing device can communicate with the smart home 100 directly, or via the server 110.

Figure 2:
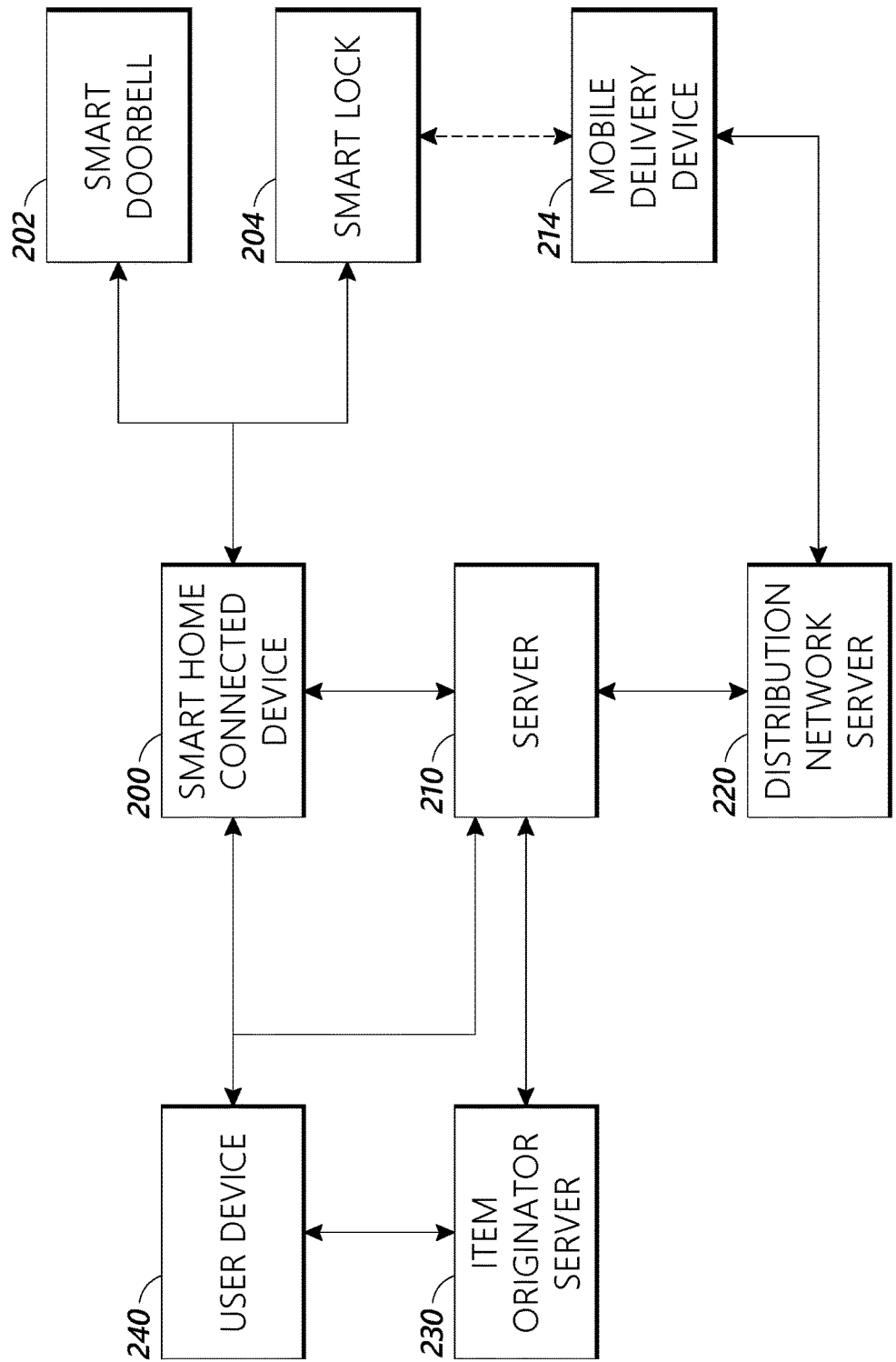
FIG. 2 is a system diagram of a home delivery integration system.

FIG. 2 depicts a block diagram of a system for item delivery to a smart home. The system includes a smart home or connected device 200 (such as a smart speaker, smart hub, computer terminal, hub, server, etc.), a server 210, a distribution network 220, an item originator server 230, and a user device 240.

The smart home 200 is in communication with a smart doorbell 202 and a smart lock 204. The smart lock 204 can include a keypad interface for unlocking the door of the smart home 100/200 or of a smart receptacle to which the smart lock 204 is attached or to which the smart lock 204 controls access. The smart lock 204 can also include a wireless communication feature that enables communication via a wireless protocol, such as Bluetooth, Zigbee, NFC, Wi-Fi, or any other wireless communication protocol, for receiving lock and unlock signals.

The server 210 is in communication with the smart home 200, the distribution network 220, the item originator server 230, and the user device 240. The server 210 can be owned, associated with, or affiliated with a smart home service provider. The smart server 210 stores user information, such as account information, and other information regarding the user. The account information and other information can include preferences for deliveries, identifiers for the user's smart devices, the user's access codes, user permissions for accessing smart devices, and other information as desired. The server 210 stores information associated with the smart home 200, the location of the smart home 200, including address, GPS location, geofence information, route information for the smart home 200, such as the identity of the route of the distribution network which services the smart home 200, and the like. The server 210 also stores information identifying and associating the smart devices connected to the smart home, such as the smart lock 204, identifiers associated with the smart home, such as resident names and/or business names, and account identifiers.

The server 210 can be a server or network owned by, associated with or affiliated with a distribution network, such as the USPS. The distribution network server 220 is in communication with the server 210, a mobile delivery device 214 and with the item originator server 230. The distribution network server 220 includes information regarding items to be delivered, recipient information, identification of delivery points, and can include smart home information. The distribution network server 220 can comprise a number of distribution network systems, databases, etc. These systems are described here as a distribution network server 220 for ease of discussion. For example, the distribution network server 220 can include a package tracking system, an addressing system, geocoordinate databases, route databases, mobile delivery device databases, customer account databases, etc.

The mobile delivery device 214 can be similar to those described elsewhere herein.

The item originator server 230 can be associated with, affiliated with, or owned by a retailer or item sender. For example, the item originator server 230 can be an online retailer or e-commerce merchant. In some embodiments, the item originator server 230 can be any entity sending an item to a recipient, including, for example, a recipient residing or doing business at a location such as the smart home 100/200.

The user device 240 can be a mobile computing device configured to communicate with the smart home 200 and the server 210. For example, the user device 240 can be a smart phone, tablet computer, desktop computer, or other computing device used by the recipient of an item to be delivered.

Figure 3:
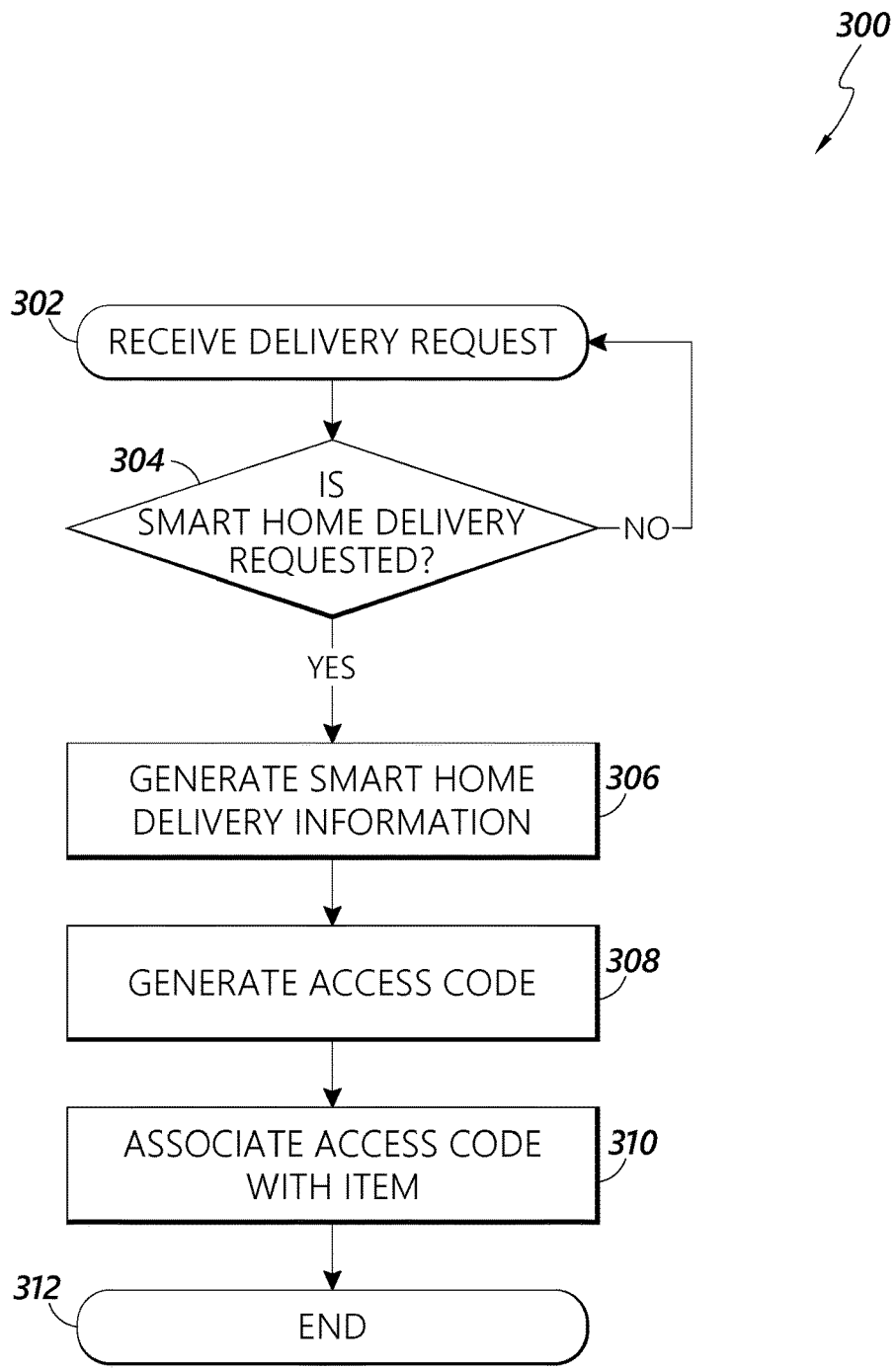
FIG. 3 depicts an exemplary process for a smart home delivery.

FIG. 3 depicts an exemplary process for initiating item delivery to a smart home 200. A process 300 begins in step 302, where a delivery request is received in the distribution network. The delivery request can be initiated by a user or recipient (user and recipient can be used interchangeably herein) placing an order for an item which will be delivered to the smart home 100. The delivery request can come from the user device 240. The user/recipient can place an order and associate the order with the user's account. The account can be a smart home service provider account, a distribution network account, or the like. In this way, the smart home service provider can initiate the delivery request by sending item information and delivery information to the distribution network server 220.

In some embodiments, the user can order an item via the item originator server 230. When the user orders an item via the item originator server 230, such as an online merchant, the user selects a delivery method, provides delivery instructions and/or delivery information, and the like. The delivery method can be a distribution network such as the USPS. The online merchant sends item information and delivery information to the distribution network server 220. A delivery record and/or item record can also be created and stored in a memory of the server 210 and/or the smart home delivery system. The item information can include details about the item, including what the item is, item size, item weight, item contents, item location of origin, item sender or shipper, a computer readable code which uniquely identifies the item, delivery instructions, delivery preferences, authorizations required, signature requirements, and any other desired information for use in distribution and delivery of the item. The delivery information can also include a delivery point identifier, which can be encoded, computer readable or human readable.

The process 300 moves to decision state 304, wherein it is determined whether smart home delivery is requested. If the user requests smart home delivery, then the process 300 moves to step 306, wherein smart home delivery information is generated. Generating smart home delivery information can include appending, updating, or generating a new recipient identifier which can include an encoded or non-encoded identifier which is recognizable to the server 210, the smart home connected device 200, and/or the distribution network server 220. In some embodiments, the recipient identifier can be assigned, generated by, and/or associated with the item originator server 230, the server 210, the smart home connected device 200, and/or the distribution network server 220. The recipient identifier can be placed on the item as a computer readable identifier readable by processing equipment of the distribution network. In some embodiments, generating smart home delivery information includes appending a delivery record or item record, or associating a delivery record or item record with a smart home delivery identifier or code. This allows systems described herein to identify that the item is designated for smart delivery processes.

The distribution network server 220 stores a delivery record or item record and any associations or other codes or identifiers, or has access to this information in the server 210. As the item is processed on item processing equipment, such as mail processing equipment for induction, sorting, transportation, and the like, the item can be identified using a computer readable code having or encoding the recipient identifier therein, as being associated with a smart home delivery throughout the distribution network and can be processed differently or alternately as required.

The process 300 moves to step 308, wherein an access code is generated. Step 308 can be performed subsequent to step 306, or can be performed at the same time or substantially at the same time as step 306.

The access code can be an alphanumeric code, a computer token, electronic credentials, encrypted information, and the like. The access code will allow the carrier or deliverer of the item access to the smart lock 204. The access code can be generated in several ways. In some embodiments, the access code can be generated by the server 210 in response to a communication from the item origination server 230.

In some embodiments, the item origination server can indicate to the server 210 or the distribution network server 220 that an item is to be delivered to a recipient having an account with a smart network or the distribution network. The server 210 can communicate a user created or assigned access code to the distribution network server 220. The user can have created or assigned the access code and stored it with the server 210 for use by the distribution network. In some embodiments, the access code can be stored in the account of the user on the distribution network server 220. In some embodiments, the access code can be generated and provided by the user device 240 to the server 210 in response to a request from the server 210 when smart home delivery is selected.

In some embodiments, generating the access code includes communicating a user-defined or user-set access code, which the user may have previously set. For example, a user of a smart home connected device 200 may have an access code defined for accessing the lock 204. The user may have separate codes established for allowing access for the user, friends, family, and parties associated with the distribution network. The user may establish a delivery access code which is stored in the server and communicated to the distribution network server 220 as required, as will be described elsewhere herein.

In some embodiments, when a delivery request is received, the server 210 can send a communication to the user device 240 requesting that the user authorize generation of a one-time code. In some embodiments, the server 210 can send a communication to the user device requesting that the user set an access code for use in delivering the item. The server 210 can receive an access code from the user device 240 and store the code until the code is needed.

In some embodiments, rather than generating an access code, in step 308 the process can set a flag in the system or note the item record to request information from the user device when the item is ready to be delivered. In this instance, the access code is not generated, but the system is alerted that user permission will be required before the lock 204 can be operated, or that user action will be required to operate the lock 204. This will be described in greater detail herein.

In some embodiments, the distribution network server 220 generates the access code and provides the access code to the server 210. Providing the access code to the server 210 can include security information to ensure that the entity providing the code is the distribution network, and that the access code is being provided by the distribution network and not coming from another source. In some embodiments, the access code generated by the distribution network server 220 can be a one-time access code. This access code can be received by the server 210 and communicated to the smart home 200, such as the smart lock 204, so the smart lock 204 will recognize the access code and grant access. This may occur at any time after the access code is generated, and may occur when the mobile delivery device is within a geofence or at a particular location in proximity to the smart lock 204. In some embodiments, the distribution network server 220 does not communicate the access code to the server 210 until the item has been scanned or indicated as out for delivery, and the carrier is approaching, nearing, or at the delivery location.

When an item tracking system of the distribution network identifies that a label or identifier for an item, such as a parcel, has been generated, the distribution network can generate an access code for that label or that specific item. The access codes can be sent to the server 210, where they can be stored for use when the carrier delivers the item.

The process 300 moves to step 310, wherein the access code is associated with the item, for example, in the delivery record or item record. In some embodiments, the delivery record can be stored on a memory of the distribution network server 220 and the item record can be stored on the server 210. Associating the access code with the item will be described in greater detail below.

Figure 4:
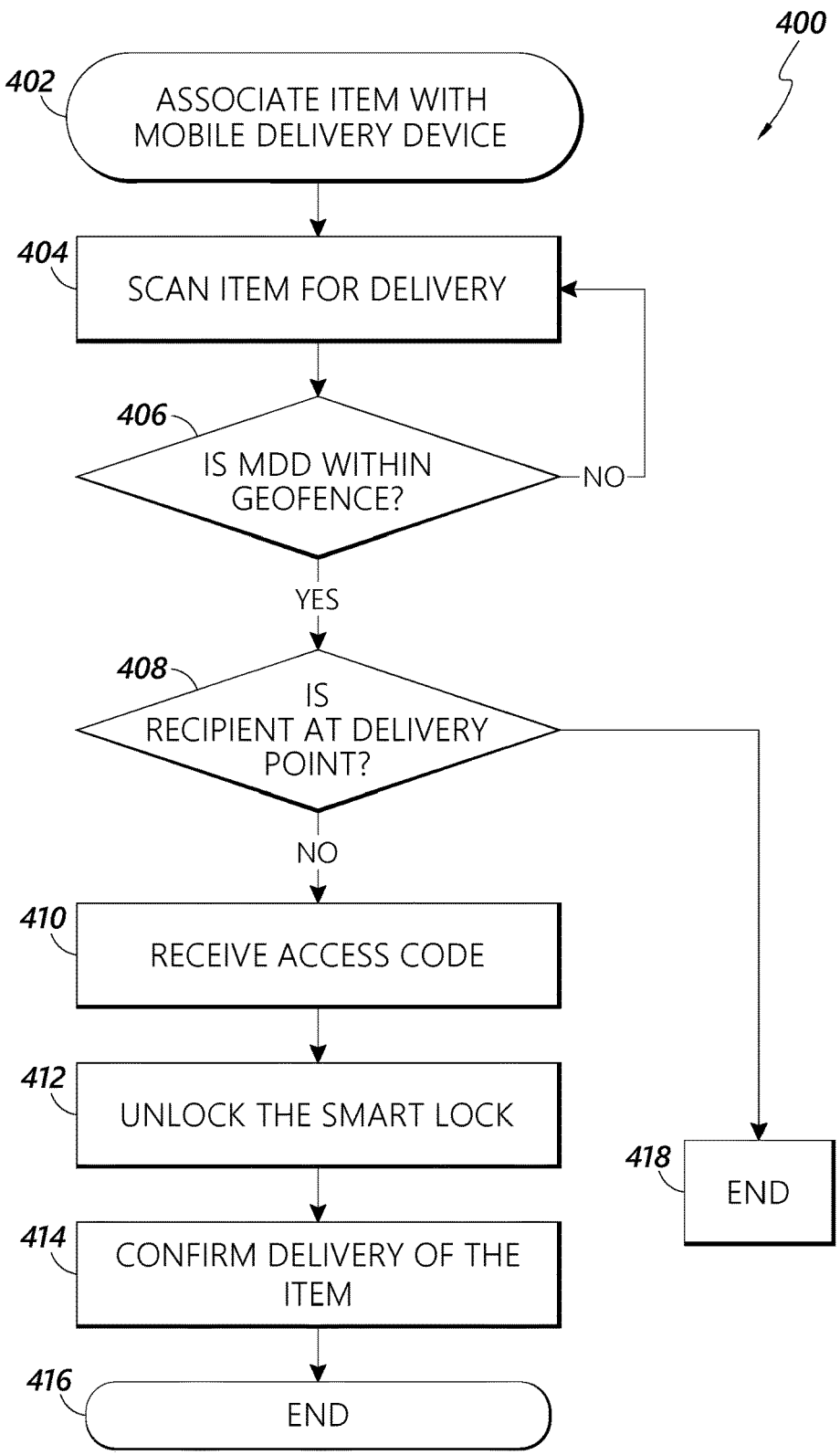
FIG. 4 depicts an exemplary process for a smart home delivery.

FIG. 4 depicts an exemplary process for delivering an item to a smart home 100. A process 400 starts in step 402, where an item is associated with a carrier or a mobile delivery device, for example, with a device carried by a carrier of a distribution network. An item to be delivered may be physically located at a unit delivery facility (such as a post office or local postal facility) awaiting last-mile delivery to the delivery point. The item will be associated with the route along which the delivery point is located. A carrier will obtain one of the mobile delivery devices 214 at the unit delivery facility and sign in to the mobile delivery device 214. The carrier will be assigned a route, and the route designation will be stored in the mobile delivery device 214, and item information and delivery information for all items along the assigned route will be loaded to the mobile delivery device 214, or will be associated with the mobile delivery device 214. The mobile delivery device 214 will receive identification for items for delivery which are indicated for delivery to a smart home 100. The mobile delivery device 214 can make this determination using the item records and/or the delivery records, or the distribution network server 220 can make this determination and can then send the item information or delivery information to the mobile computing device 214 for these items. In some embodiments, this determination may not be made at this stage of the process.

The process 400 moves to step 404, wherein the carrier scans an item for delivery. This scan can occur when the item and carrier leave the unit delivery facility, or when the carrier is at a delivery point. The carrier can scan a computer readable code on the physical item. The mobile delivery device 214 can identify the item as an item intended for delivery to a smart home 100, or the mobile delivery device 214 can send the scan information to the distribution network server 220. The scan information can include information encoded in, stored in, or associated with the computer readable code. The scan information can include a unique identifier for the item, the delivery point, the recipient, service class, and any other desired information. The unique identifier can be used to identify the item to the server 210 o and/or the distribution network server 220. The distribution network can query a database and determine that the computer readable code on the item has an association in an item and/or delivery record for a smart home delivery. The distribution network server 200 and the mobile delivery device can receive an indication that the scanned item is intended for delivery to a smart home 200.

The process 400 next moves to decision state 406, wherein it is determined whether the mobile delivery device 214 is within a geofence associated with the delivery for the item. The trigger for this process can be the delivery scan event, or the process can trigger with a set periodicity, or when requested by the carrier. When the computer readable code is scanned, the item and delivery information can be accessed by the mobile delivery device 214. The delivery information can include an identifier of the delivery point, as described above. In some embodiments, the delivery point is encoded within the computer readable code on a label attached to the item. The mobile delivery device 214 can determine whether its current location, based on a geolocation circuit, such as GPS, is within a pre-defined geofence or a pre-defined distance from the delivery point identified from the scan of the item. This determination can be made on the mobile delivery device 214, or can be made on the distribution network server 214. If the device is not within the geofence associated with the delivery point, or is not within the pre-determined distance of the delivery point, the process moves to step 404, and awaits scanning of the item in step 404.

In some embodiments, determining whether the mobile delivery device 214 is within the geofence further includes determining whether the GPS breadcrumb data shows that the carrier is traversing a normally assigned route at an expected time. For example, in order to confirm the mobile delivery device 214 is at the delivery point, the server 210 and/or the distribution network server 220 can receive or access GPS breadcrumb data for the mobile delivery device 214 which scanned the item. The GPS breadcrumb data should indicate that the mobile delivery device 214 was previously at the preceding delivery point along the route, and prior to that, at the next preceding delivery point, etc. If the server 210 does not receive a confirmation that the mobile delivery device 214 was along its predetermined route based on breadcrumb data, authorization to operate the smart lock 204 will be denied. This can improve security for the USPS in a unique way, as the USPS routes are static routes in which delivery points are traversed in the same order at generally the same time of day, each day. By ensuring the carrier has been traversing the pre-assigned route prior to accessing the smart lock 204, the customer or recipient can have an added assurance of security that the system will only grant access to the smart lock 204 for authorized carriers, and that the smart locks 204 cannot be accessed by improper parties, even if a party were to obtain a mobile delivery device without permission.

Additionally, the geofence confirmation can be enabled to only work during particular hours, such as normal business hours, or at times that the carrier would be expected to be traversing the delivery route. These measures will ensure that the carrier will not be allowed access to open a smart lock 204 unless the carrier is traversing the carrier's assigned route at an expected time. This also can increase confidence in and security of the smart home delivery system.

If the device is within the geofence associated with the delivery point, or is within the pre-determined distance of the delivery point, the process moves to decision state 408. In decision state 408, it is determined whether the recipient of the item is at the delivery point. This can occur in several ways. For example, the carrier can simply knock at the door. If the recipient opens the door, the item is delivered, any necessary signature is given, and the process ends in step 410. In some embodiments, decision state 408 is no performed, or is not necessary. For example, where a signature authorization is not required, this step may be omitted. Additionally, if the smart lock 204 is on a smart receptacle, the system may not be required to determine whether a recipient is home.

If the recipient is not at the delivery point, no one will answer the door, and the carrier can make a selection on the mobile delivery device 214 indicating that the recipient is not at the delivery point. The process 400 moves to step 410, wherein an access code is received. Step 410 will be described greater detail below. In embodiments where decision state 408 is not performed, receiving the access code in step 410 occurs following decision state 406, and the carrier need not make a selection that the recipient is not home.

Another method for determining whether the recipient is at the delivery point includes utilizing the smart doorbell 202. The carrier can ring the smart doorbell 202. The smart home connected device 202 determines that the smart doorbell 202 has been rung or operated, and can start a timer. When a threshold or specified period of time has elapsed, the smart doorbell 202 can send a signal to the smart home connected device 200, or the server 210 can be notified that the smart doorbell 202 was operated and the determined amount of time has elapsed. During this process, the smart doorbell 202 can be recording video and/or audio of the carrier at the delivery point.

After the determined time has elapsed, the process moves to step 410, wherein the access code is received in the mobile delivery device 214. In some embodiments, the process 400 cannot proceed to step 410, that is, the mobile delivery device 214 cannot receive the access code, until after the smart doorbell 202 has been rung, no one opened the door, and the predetermined amount of time has elapsed.

In some embodiments, the access code is received automatically when the prior steps are performed.

In step 410, the mobile delivery device 214 communicates its location and the item code to the distribution network server 220. This communication can happen at any point during process 400, it is described here for convenience and clarity.

The distribution network 220 communicates with the server 210 and indicates, using whatever information the server 210 requires, for example, the item information or delivery information, or the identifier uniquely identifying the item. When the server 210 receives the item identifying information, the server 210 can provide the access code to the distribution network server 220, and the distribution network server 220 can communicate the access code to the mobile delivery device 214. In some embodiments, the access code can be an alphanumeric code which is displayed on the mobile delivery device 214. In some embodiments, the access code is a token or similar feature to be communicated to the smart lock 204. In some embodiments, the mobile delivery device 214 wirelessly communicates a signal to the smart lock 204, and the signal opens the smart lock 204. In some embodiments, the mobile delivery device 214 sends an unlock signal to the smart lock 204, the smart lock 204 communicates the received signal to the smart home connected device 200, the smart home connected device sends the received signal to the server 210. The server 210 confirms the identity of the mobile delivery device 214 that send the signal, which can be included in the signal. The server 210 can confirm the GPS breadcrumb data, time of day, existence of an item record for smart home delivery and the item identifier, which can be included in the signal send by the mobile communication device 214, or any other desired information. When the server 210 has confirmed the delivery is proper, that the carrier has the proper location and breadcrumb trail, or meets other security standards, the server 210 can instruct the smart lock 204 to open. The signal can be provided to the mobile computing device 214 by the server 210 and/or by the distribution network server 220.

In some embodiments, after the distribution network 220 communicates the item information to the server 210, the server 210 sends a notification to the user device 240. The user can then select an access code and send that to the server 210, or the user can authorize and request opening of the smart lock 204. The server can communicate the request for smart lock 204 operation to the smart home connected device 200, and in turn, the smart home connected device 200 communicates the unlock signal to the smart lock 204.

The process moves to step 412, wherein the smart lock 204 is operated, and the door is opened, and the item is delivered to the interior of the house, to an internal volume of a smart receptacle, to a garage, or other location secured by the smart lock 204. The smart lock 204 can be operated by the carrier keying in the alphanumeric code received on the mobile delivery device 214, or by exchanging tokens or a handshake with the smart lock 214 via a wireless protocol, or by instruction from the user device 240 to operate the lock.

It can be advantageous for security and recipient peace of mind to ensure that the mobile delivery device 214 which is assigned to the route along which the delivery point is located is within the geofence associated with the delivery point. This ensures that the carrier from the distribution network is the person accessing the lock, and prevents unauthorized operation of the smart locks 204.

The process 400 moves to step 414, wherein delivery of the item is confirmed. Item delivery can be confirmed by a delivery scan of the item by the carrier using the mobile delivery device 214. For example, the carrier can scan the item after placing the item in the house. A scan of the physical item after the distribution network 220 and/or the server 210 identify that the access code has been provided and the lock operated, the scan can be used as a delivery confirmation scan. In some embodiments, the delivery confirmation can be generated after the smart lock 204 identifies the door has been closed following operation with the access code. When the door has been closed, the smart lock 204 communicates the door closure to the smart home connected device 200, and in turn, to the server 210 and the distribution network server 220. The delivery confirmation can be provided to the user device 240 along with a video or image of the carrier leaving the door taken by the smart doorbell 202. This can assure the recipient that the carrier has left the delivery point.

The process moves to step 416 and ends.

Skilled artisans will recognize that, depending on the embodiment, certain acts or events of any of the methods described herein can be performed in a different sequence, may be added, merged, or left out altogether. Not all described acts or events are necessary for the practice of the method. Moreover, in certain embodiments, acts or events may be performed concurrently, for example, through multi-threaded processing, interrupt processing, or multiple processors, rather than sequentially.

Although above steps of the above processes have been described a particular order, the steps are not limited to performance in the order indicated. It will be understood by a person of skill in the art, guided by the teachings herein, that the steps of the processes described herein may be performed in one or more orders, as desired. A person of skill in the art will further recognize than the above-outlined steps can be performed in any desired order, and can include sub-steps or sub-processes.

Those of skill will recognize that the various illustrative logical blocks, modules, circuits, and algorithm steps described in connection with the embodiments disclosed herein may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, servers, memories, hardware, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor reads information from, and write information to, the storage medium. In the alternative, the storage medium may be integral to the processor. The processor and the storage medium may reside in an ASIC.

While the above detailed description has shown, described, and pointed out novel features of the disclosure as applied to various embodiments, it will be understood that various omissions, substitutions, and changes in the form and details of the device or process illustrated may be made by those skilled in the art without departing from the spirit of the disclosure. As will be recognized, the present disclosure may be embodied within a form that does not provide all of the features and benefits set forth herein, as some features may be used or practiced separately from others. All changes which come within the meaning and range of equivalency of the claims are to be embraced within their scope.

A person skilled in the art will recognize that each of these sub-systems may be inter-connected and controllably connected using a variety of techniques and hardware and that the present disclosure is not limited to any specific method of connection or connection hardware.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, a microcontroller or microcontroller based system, programmable consumer electronics, network PCs, minicomputers, mainframe computers, distributed computing environments that include any of the above systems or devices, and the like.

As used herein, instructions refer to computer-implemented steps for processing information in the system. Instructions may be implemented in software, firmware or hardware and include any type of programmed step undertaken by components of the system.

A microprocessor may be any conventional general purpose single- or multi-chip microprocessor known or commonly used in the art. In addition, the microprocessor may be any conventional special purpose microprocessor such as a digital signal processor or a graphics processor. The microprocessor typically has conventional address lines, conventional data lines, and one or more conventional control lines.

The systems described herein may be used in connection with various operating systems such as Linux®, UNIX®, MacOS®, Microsoft Windows®, and/or mobile operating systems such as iOS, Android, and the like.

The system control may be written in any conventional programming language such as C, C++, BASIC, Pascal, .NET (e.g., C #), or Java, and run under a conventional operating system as known in the art. C, C++, BASIC, Pascal, Java, HTML, FORTRAN, and other industry standard programming languages may be used. The system control may also be written using interpreted languages such as Perl, Python or Ruby. Other languages may also be used such as PHP, JavaScript, and the like.

The foregoing description details certain embodiments of the systems, devices, and methods disclosed herein. It will be appreciated, however, that no matter how detailed the foregoing appears in text, the systems, devices, and methods may be practiced in many ways. As is also stated above, it should be noted that the use of particular terminology when describing certain features or aspects of the invention should not be taken to imply that the terminology is being redefined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment may be included with other depicted embodiments in any combination. For example, any of the various components described herein and/or depicted in the Figures may be combined, interchanged or excluded from other embodiments.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods and materials of the present disclosure. This disclosure is susceptible to modifications in the methods and materials, as well as alterations in the fabrication methods and equipment. Such modifications will become apparent to those skilled in the art from a consideration of this disclosure or practice of the development disclosed herein. Consequently, it is not intended that this disclosure be limited to the specific embodiments disclosed herein, but that it cover all modifications and alternatives coming within the true scope and spirit of the disclosure as embodied in the attached claims.

While the above detailed description has shown, described, and pointed out novel features of the improvements as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A system for item delivery, the system comprising:
a distribution network server in communication with a locking device;
a mobile delivery device in communication with the server, the mobile delivery device comprising a scanner and a location sensing circuit, the mobile delivery device being associated with one of a plurality of delivery routes and storing a route identifier for the one of the plurality of delivery routes; and
a distribution network server configured to receive location information and the route identifier from the mobile delivery device and to store an association between a delivery point and the route identifier; and
wherein the distribution network server is configured to communicate the access code to the mobile delivery device when the mobile delivery device is within a geofence of the delivery point along the one of the plurality of delivery routes associated with the mobile delivery device, and wherein the locking device is configured to be unlocked in response to receiving the access code and a route identifier if the route identifier received from the mobile delivery device matches the route identifier associated with the delivery point.

2. The system of claim 1, wherein the location information comprises a current location of mobile delivery device as determined by the location sensing circuit.

3. The system of claim 2, wherein the location information further comprises breadcrumb data.

4. The system of claim 1, further comprising an item originator server configured to communicate item information to the server in response to an item being ordered and designated for delivery via a distribution network.

5. The system of claim 4, wherein the item originator server is configured the item information to the processor.

6. The system of claim 4, wherein the item originator server is configured to generate the access code.

7. The system of claim 1, wherein the mobile delivery device is configured to send the access code and the route identifier to the locking device.

8. A method of item delivery comprising:
storing, in a mobile computing device, a route identifier identifying one of a plurality of delivery routes;
receiving, in a processor, location information and the route identifier from the mobile computing device;
generating, in a processor, an access code for opening a smart lock associated with the delivery point based on received location information and route identifier;
storing, in a processor, an association between the delivery point and the route identifier and the locking device and the delivery point
sending, to the locking device, the access code and the route identifier; and
determining that the route identifier sent to the locking device matches the stored route identifier associated with the delivery point and the locking device; and
allowing access to a lockable volume secured by the smart lock based on the received access code when the route identifier matches the stored route identifier.

9. The method of claim 8, wherein the location information includes geographic coordinates of the mobile computing device.

10. The method of claim 9, wherein the location information further comprises breadcrumb data.

11. The method of claim 10 wherein allowing access to the lockable volume comprises unlocking the locking device in response to receiving the access code and the route identifier.

12. The method of claim 8, wherein the mobile delivery device sends the access code and the route identifier to the locking device.

13. The method of claim 8, further comprising determining whether the time of day when the scan occurred corresponds with the route identifier.

* * * * *